Feb. 27, 1968   P. S. CARTER   3,371,347
DIRECTION FINDING ANTENNA SYSTEM
Filed April 6, 1966   2 Sheets-Sheet 1

INVENTOR.
PHILIP S. CARTER
BY Samuel Lindenberg
Arthur Frederick
ATTORNEYS

INVENTOR.
PHILIP S. CARTER

United States Patent Office 3,371,347
Patented Feb. 27, 1968

3,371,347
DIRECTION FINDING ANTENNA SYSTEM
Philip S. Carter, Palo Alto, Calif., assignor to Control Data Corporation, Minneapolis, Minn., a corporation of Minnesota
Filed Apr. 6, 1966, Ser. No. 540,675
10 Claims. (Cl. 343—113)

ABSTRACT OF THE DISCLOSURE

An arrangement for determining the angle of arrival and/or the frequency of electromagnetic waves is determined by the combination of an omni-directional antenna, such as a biconical horn antenna, with a dipole element placed at its center, together with a ferrite resonator and a loop element. The biconical horn antenna receives electromagnetic waves from all directions and transmits any received waves to its center. The dipole element detects these waves and its output has a phase which is independent of the direction from which the waves come. The ferrite element resonates in response to the received waves and generates a circularly polarized wave. The magnetic field of the circularly polarized wave rotates but has a direction at any instant which is dependent upon the angle of arrival of the original wave. The resonator-generated wave induces a current in the loop element which has a phase delay proportional to the angle of arrival of the arrival of the original wave incident on the horn antenna. By comparing the reference phase obtained from the output of the dipole element with the phase of the signal from the loop element the direction from which the waves arrive is determined. The strength of a magnetic field in which the ferrite element is placed can be varied until the element resonates in the received electromagnetic field. The magnet field strength may thus be used to provide an accurate indication of the frequency of the detected microwaves.

Background of the invention

This invention relates to apparatus for detecting electromagnetic waves and more particularly to antenna systems for determining the angle of arrival and/or frequency of electromagnetic waves.

In several important applications it is necessary to detect the presence of electromagnetic waves, and to rapidly determine their direction and frequency. For example, it may be necessary for a military aircraft to detect enemy radar signals, which may originate from any direction of the compass and which may have any frequency within a wide range. For maximum ruggedness and ease of operation it is preferable that the detection apparatus have as few moving parts as possible, and that it search all directions and a wide band of frequencies very rapidly, and automatically indicate both the frequency and direction of any detected waves.

Accordingly, one object of the present invention is to provide a detector for electromagnetic waves, which is more rugged and more efficient than those available heretofore.

Another object is to provide an antenna system for high frequency electromagnetic waves which enables the determination of the direction of the waves more easily than heretofore.

Yet another object is to provide a wide frequency band and unidirectional detector which rapidly indicates the frequency and direction of received microwaves with greater facility than detectors available heretofore.

The foregoing and other objects are realized, in one embodiment of the invention, by apparatus comprising an omnidirectional antenna, such as a biconical horn antenna, for receiving electromagnetic waves from all directions. The waves received by the horn antenna are transmitted to its center where a dipole element, a ferrite resonator, and a loop element are located. The dipole detects the waves, and its output has a phase which is independent of the direction from which the waves come. The phase of the dipole output is used as a reference.

The waves transmitted to the center of the antenna also cause the ferrite element to resonate and to generate a circularly polarized wave. The resonator-generated wave has a magnetic field which rotates and whose direction at any instant depends upon the angle of arrival of the original wave. The resonator-generated wave induces a current in the loop element surrounding the resonator, which current has a phase delay, proportional to the angle of arrival of the original wave incident on the horn antenna. By comparing the reference phase obtained from the dipole element with the phase of the signal from the loop element, one can determine the direction from which the waves arrived.

The ferrite element is maintained in a constant magnetic field, which passes across the central portion of the antenna, to enable it to resonate. Ferrite elements, such as the commonly used yttrium-iron-garnet type, are capable of resonating efficiently at high frequencies, generally 50 mc. to 80 gc. or higher, when in a magnetic field, the resonant frequency being a precise function of the intensity of the magnetic field. Thus, microwave signals received by the biconical horn antenna and transmitted to the ferrite material, will cause the element to resonate, if the frequency of the microwaves is the same as the resonant frequency of the ferrite element. The magnetic field strength can be varied until the element resonates, and the magnetic field strength required is an accurate indication of the frequency of the detected microwaves. Thus, the antenna system of the invention readily indicates both the direction and frequency of ambient electromagnetic waves.

A better understanding of the invention and various of its features can be gained from the following description, taken in conjunction with the accompanying drawings wherein.

Figure 1:
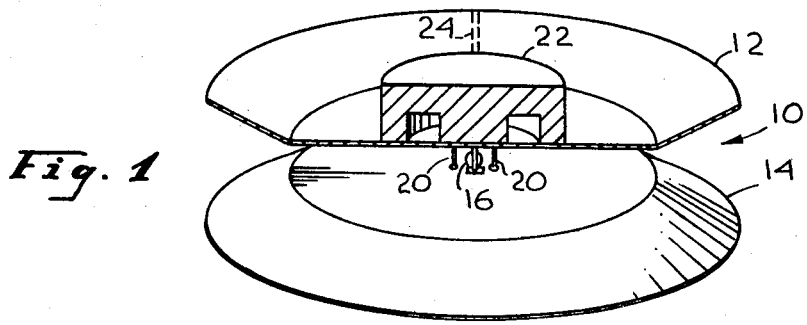
FIGURE 1 is a pictorial, partial broken view of an antenna system constructed in accordance with the invention.

The embodiment of the invention shown in FIGURE 1 comprises a biconical horn antenna 10 having an upper truncated cone 12, or section, and lower truncated cone 14, for receiving high frequency radio, or electromagnetic waves. The received waves are transmitted to the central portion of the horn antenna where a yttrium-iron-garnet ferrite element 16, bent dipole elements 18, and a loop element 20 are mounted. A magnet 22 is disposed on opposite sides of the antenna cones. The magnet 22 creates a magnetic field which passes through the central region of the antenna, where the ferrite element 16 is located. Three vanes 24 (represented by dotted lines)

hold the upper cone 12 and the magnet half thereon a predetermined distance above the lower cone 14.

Figure 3:
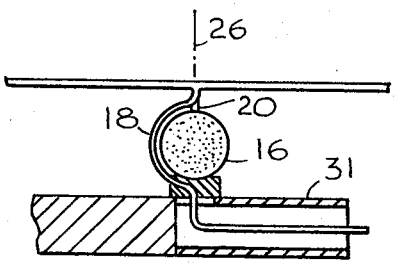
FIGURE 3 is a partial view, partly in section, taken along the lines 3—3 of FIGURE 2.

When an electromagnetic wave is incident on the rim of the horn antenna 10, a transverse electromagnetic wave (TEM) is propagated between the cones and passes the dipole elements 18. The alternating electric field of the wave generates an electric signal in the dipole, of the same frequency and of the same phase as the wave passing by the dipole. The signal on the dipole is transmitted along a coaxial line 31, as shown in FIGURE 3. It may be noted that the dipole elements 18 are bent slightly to avoid the ferrite element 16; this bend has little effect on the performance of the device.

Figure 4:
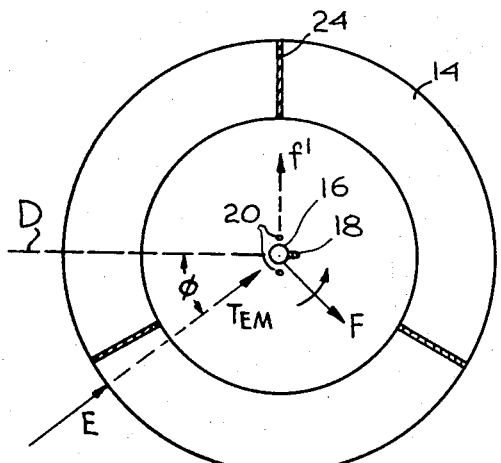
FIGURE 4 is a top view of the antenna system of FIGURE 2 taken along the lines 4—4 therein.

The purpose of the ferrite 16 and loop 20 elements is to generate a signal whose phase varies with the direction, or angle of incidence, of the wave incident on the rim of the horn antenna. When the TEM wave passes the ferrite element 16, and has the resonant frequency of the ferrite element, the ferrite resonates in response and generates transverse electric waves in the $TE_{10}$ mode. The direction of maximum magnetic field F shown in FIGURE 4 of the ferrite-generated $TE_{10}$ wave will be found to have a radial direction at the center of the ferrite and to rotate at the frequency of the original TEM wave about the axis 26 which passes through the center of the ferrite element. The magnetic field passes through the area of the loop element 20, and induces a current in the loop. The current in the loop 20 has a frequency equal to that of the signal generated in the dipole element 18, but generally has a different phase.

The phase of the signal in the loop element 20 is a direct function of the phase, or direction at any instant, of the magnetic field F generated by the resonator 16. For example, when the field F, which is rotating, is in line with the two wires of the loop 20, as is shown by the field $f'$ in FIGURE 4, no magnetic field passes through the loop but the rate of change of field passing through the loop is a maximum, and the current induced in the loop is a maximum. The direction of the magnetic field F generated by the ferrite resonator 16 at any instant is a function of both the phase of the TEM signal passing by the ferrite and the direction in which the TEM wave is moving. The direction of movement of the TEM wave is, of course, the same as the direction of movement of the original electromagnetic wave which is incident on the horn antenna. Thus, the phase of the signal induced in the loop element 20 is increased or decreased by the same angle as the direction the electromagnetic wave E makes with a predetermined direction wherein there is no phase shift.

For an electromagnetic wave E arriving at an angle $\phi$ with the reference direction D, the signal induced in the loop element 20 is given by $$e_e = A \sin (w - \phi)t$$

where $e_e$ is the voltage or current induced in the loop at any instant, A is the maximum amplitude of the induced voltage or current, $w$ is $2\pi$ times the frequency of the electromagnetic wave, $t$ is time, and $\phi$ is the phase delay of the induced signal.

The signal induced in the dipole element is given by $e_d = A_d \sin wt$, where $e_d$ is the voltage or current induced in the dipole and $A_d$ is the maximum amplitude of the dipole signal.

The loop element current $e_e$ and dipole element $e_d$ are of the same frequency, but differ in phase by the angle $\phi$, which represents the angle of incidence of the original wave on the antenna. By determining the phase angle between the signals in the dipole cable 31 and the signals in the loop element cables 28 and 30, the angle of incidence of the wave on the antenna can be determined.

An examination of the construction of the loop element 20 shows that it includes two wires located on either side of the ferrite element 16. One end of each wire is connected to the top cone 12 and the other end of each wire is respectively connected to the inner wire of respective coaxial lines 28 or 30. The outer conductors of the coaxial cables 28 and 30 are connected to the bottom cone 14.

Figure 2:
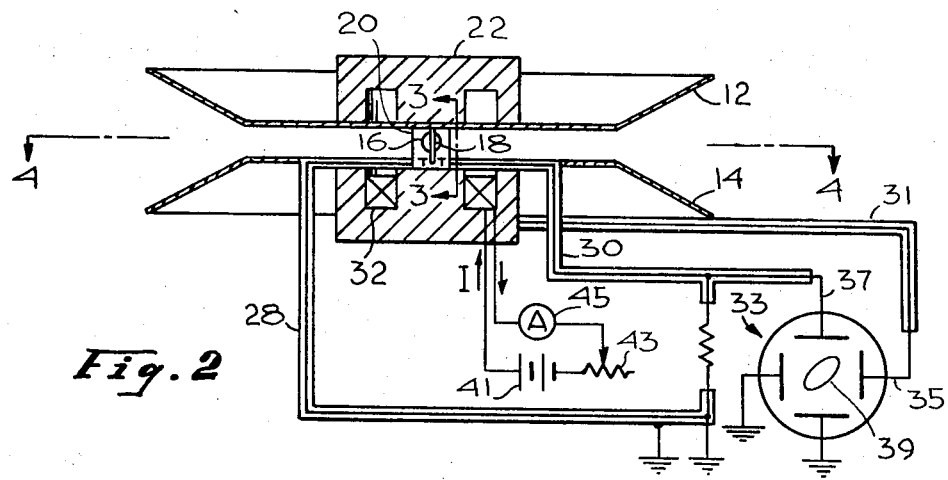
FIGURE 2 is a sectional view of the antenna system of FIGURE 1.

A phase comparison of the dipole and loop signals can be accomplished in many ways. One of the simplest ways, illustrated in FIGURE 2, is to connect the dipole output 31 to one set of plates of an oscilloscope 33 such as the horizontal set 35 and to connect the loop output 30 to the other set of plates 37. The dipole and loop outputs may first be heterodyned to obtain an IF signal which may be more convenient to use. The oscilloscope screen displays the well known "Lissajou" figure 39 which indicates the phase relationship of the signals. For example, a circle indicates the signals are out of phase by 90°, a line indicates the signals are in phase or 180° out of phase (whether in phase or 180° out of phase is indicated by whether the shape of the line is positive or negative), and an oval indicates other phase relationships, with the narrowness of the oval and the sign of its slope defining the exact phase relationship. Of course, various phase comparison circuits can be used to obtain a more easily or accurately readable phase indication.

The signals obtained from the dipole 18 and loop elements 20 are relatively independent of each other even though the elements are located close together near the center of the antenna. Currents in the loop flow in a "push-pull" arrangement, that is, while current in one wire flows toward the top cone 12 current in the other wire flows away from the top cone. Since the dipole is located in the plane of symmetry of the loop 20, the effects of loop currents on the dipole cancel out. The coupling between the resonator 16 and the dipole 18 is small because the electric field of the $TE_{10}$ mode is weak immediately around the resonator, where the dipole is located.

The yttrium-iron-garnet (YIG) resonator 16 resonates at a frequency which is determined by the intensity of the magnetic field in which it is located. The intensity of the magnetic field is determined by the current I flowing through the magnet coil 32 (see FIGURE 2). By measuring the current I through the coil 32 of the magnet 22 when a signal is obtained from the loop element outputs 28 and 30, the frequency of the detected signal is measured. A battery 41 and rheostat 43 can be used to supply a variable current and a current meter 45 can be used to measure current. The identification of the received frequency can be made to within 0.1% by measuring current. This technique eliminates the need for calibration charts inasmuch as the frequency versus coil current characteristics of the yttrium-iron-garnet resonator are accurate to within less than 0.1%. The variation of coil current can be done automatically to sweep a wide band of frequencies. The frequency band of a YIG resonator is typically about 1% of the resonant frequency so that the frequency of detected waves can be accurately determined.

The electromagnet 22 has two large air gaps in the magnetic path, which necessitates the use of large currents to maintain the magnetic field strengths necessary for high frequency operation. The antenna 10 can be provided with a central area of reduced height to reduce the air gaps and reduce the energization required for the coils 32. Additionally, a permanent magnet can be used to supplement the electromagnet, by replacing a portion of the central core of the maget by a disk-shaped permanent magnet.

A broad band of frequencies can be monitored by continually varying the current I in the coils 32, to enable the resonator to resonate at any frequency within a broad range. Of course, various known techniques can be used to stop a change in current I when a loop signal from outputs 28 or 30 is detected, or to record the current I at which loop outputs have been detected. The range of frequencies which can be monitored by a given antenna system is generally determined by the antenna cones 12 and 14, rather than the resonator 16. A biconical horn antenna can efficiently receive signals over a frequency range of 2.5 to 1, and in some designs over a range of 5 to 1. For lower frequencies, such as 50 mc., a gallium crystal can be used in place of the yttrium-iron-garnet ferrite.

Figure 5:
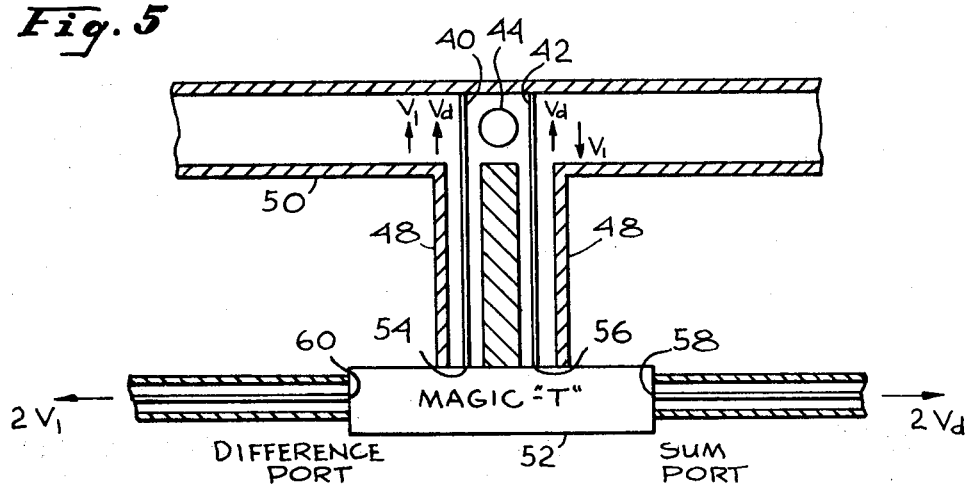
FIGURE 5 is a sectional view of another embodiment of an antenna system of the invention.

In the embodiment of the invention previously described herein, the phase-reference signal was obtained through the use of a dipole element 18. Another embodiment of the invention is illustrated in FIGURE 5 which eliminates the use of a separate dipole element, and instead, obtains the dipole phase-reference signal from the two wires 40 and 42 of the loop element. Thus, the loop element serves both to produce a phase-reference signal by interaction with the original TEM wave transmitted by the biconical horn antenna, and to produce a signal by interaction with the $TE_{10}$ wave generated by the resonator element 44.

The voltages induced in the wires 40 and 42 are represented in FIGURE 5 by voltage $V_d$ and $V_1$. $V_d$ represents the dipole voltage, which would be obtained from a dipole element by reason of its interaction with the incoming TEM wave. It may be noted that the $V_d$ voltage on each wire 40 and 42 is in the same direction. $V_1$ represents the loop voltage which is obtained by reason of the interaction of the loop with the resonator $TE_{10}$ wave. It should be noted that the $V_1$ voltages on the wires 40 and 42 are in opposite directions. The net voltage of the wire 40 with respect to the grounded outer conductor 48 (which is grounded to the lower cone 50) is $V_d+V_1$ while the net voltage of the wire 42 with respect to its outer conductor is $V_d-V_1$.

The Magic-"T," or bridge network 52, is a device for obtaining the instantaneous sum and difference of two voltage inputs. The wires 40 and 42 are connected to the two input ports 54 and 56 of the network. The sum output port 58 delivers a voltage equal to the sum of the voltages on wires 40 and 42, which is $V_d+V_1+(V_d-V_1)=2V_d$. Thus, the output port 58 delivers a signal which is proportional to the dipole voltage at every instant, and can be used as a phase-reference signal. The difference output port 50 delivers a voltage equal to the difference between the voltage on wires 40 and 42, which is $$V_d+V_1-(V_d-V_1)=2V_1$$

(The wire connections to the Magic-"T" may be reversed to yield $-2V_1$, which represents a 180° phase shift.) Thus, the output port 60 delivers a signal which is proportional to the loop voltage at every instant, and therefore whose phase is proportional to the direction of the electromagnetic wave incident on the antenna. While a Magic-T network 52 comprising a junction of four waveguides can be used, a wide band strip-line Magic-T can be used, such as the type described in "Wide Band Strip Line Magic-T," by E. M. T. Jones in Transmission Microwave Theory and Technique, vol. MTT-8, No. 2, March 1960, published by the Institute of Electrical and Electronic Engineers, Inc.

Figure 6:
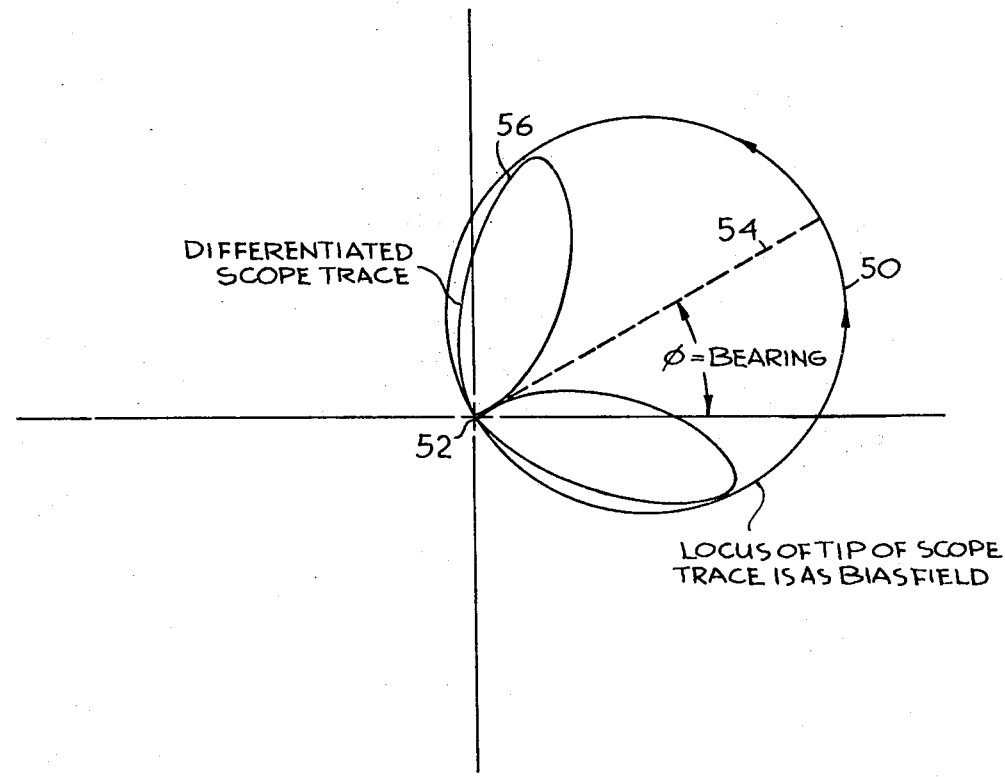
FIGURE 6 is a phasor diagram illustrating the appearance of the output of the antenna as the bias field is varied.

The phase shift of the voltage induced in the loop by the ferrite element depends uniquely on the direction of arrival of the incoming wave only if the frequency of the incoming signal is equal to the resonant frequency of the ferrite element. The resonant frequency of the ferrite element is proportional to the magnetic bias field. However, in most practical situations the magnetic field must be varied to tune the receiver. In this case the phase and amplitude of the voltage induced in the loop will vary over a range of angles. FIGURE 6 shows a phase diagram which indicates the variation of the amplitude and phase of the loop signal as the magnetic field is varied around the value at which the incoming signal frequency is equal to the resonant frequency of the ferrite element. As can be observed in FIGURE 6, the tip of the phasor traces out a circular pattern whose tip lies on the circumference of a circle 50. One edge of this circle interacts the origin of coordinates 52 of the phase diagram. The diameter of the circle 54 which intersects the origin indicates the direction of arrival of the incoming signal. The circular diagram shown in FIGURE 6 may be presented on an oscilloscope by one of a variety of conventional circuits. The direction of arrival indication can be made more distinct by differentiating the outline of the tip of the phasor diagram to obtain the clover leaf pattern 56 shown in FIGURE 6.

While particular embodiments of the invention have been described, various modifications may be resorted to by those skilled in the electronics art, and the invention is limited only by a just interpretation of the following claims.

What is claimed is:

1. An antenna system comprising:
    a multidirectional antenna means for receiving electromagnetic waves from a multiplicity of directions;
    detector means positioned at least partially within said antenna means for generating a first alternating electrical signal having a direction which is independent of the phase of the electromagnetic waves received by said antenna means;
    for generating a second alternating electrical signal having a phase which is a function of the direction of propagation of said waves, or angle of incidence of said waves on said antenna means; and
    indicating means connected to said detector means for receiving said first and second alternating signals and for indicating the direction of origin of said waves as a function of the phase difference between said signals.

2. An antenna system as defined in claim 1 wherein:
    said detector means comprises a dipole element for generating said first alternating electrical signal, and a combination of a resonator device for generating waves, and a loop element for detecting said waves generated by said resonator device.

3. An antenna system as defined in claim 1 wherein:
    said detector means comprises a resonator device positioned within said antenna means, a first loop element adjacent to said resonator device, a second loop element positioned substantially parallel to said first loop element, and a network device having at least two input ports connected to said first and second loop elements and two output ports which deliver signals representing the sum and difference of the signals delivered to the input ports.

4. An antenna system as defined in claim 1 wherein:
    said antenna means is an omnidirectional horn-type antenna having first and second sections;
    said detector means includes a dipole element disposed in the central portion of said omnidirectional antenna, with one end of said dipole element connected to one section of said antenna and the other end of said dipole element connected to a dipole output line for generating said first alternating electrical signal, and a symmetrical ferrite element disposed in the central portion of said antenna, magnet means for maintaining a magnetic field in the region occupied by said ferrite element, a loop having elongated conductors disposed on either side of said ferrite element, each of said conductors having one end connected to one half of said omnidirectional antenna and the other end connected to a loop output line, for generating said second alternating electrical signal;
    and including means for varying the magnetic field produced by said magnet means in said region occupied by said ferrite element.

5. An antenna system as defined in claim 1 wherein said antenna means is an omnidirectional horn-type antenna having upper and lower cone-like elements; and including
    a ferrite element disposed at the central portion of said horn-type antenna, and a magnet means for maintaining a magnetic field in the region occupied by said ferrite element;

wherein said detector means comprise two parallel loop elements disposed about said ferrite element, and a Magic-T network having input ports connected to said first and second loop elements and at least two output ports, providing one output port signal proportional to the sum of the voltages induced in said two loop elements and a second output port providing a signal proportional to the difference between the voltages induced in said two loop elements, said first and second output ports providing said first and second alternating electrical signals, respectively.

6. An antenna system as defined in claim 1 wherein:

said antenna means is an omnidirectional antenna for transmitting at least the TEM wave electromagnetic waves having a frequency within a predetermined band of frequencies;

said detector means comprises a resonator means for generating a $TE_{10}$ wave in said antenna, and elements disposed in said antenna adjacent to said resonator for detecting both said TEM wave to provide said first alternating electrical signal and said $TE_{10}$ wave to provide said second alternating electrical signal.

7. An antenna system comprising:

an omnidirectional antenna having a central region;

a dipole means positioned in said central region for detecting electromagnetic waves incident on said antenna and propagated to said central region;

a ferrite element positioned in said central region adjacent to said dipole means;

magnet means for producing a magnetic field in the region occupied by said ferrite element;

a loop means disposed about said ferrite element for receiving waves generated by said ferrite element; and phase comparing means connected to said dipole and loop means for indicating the phase difference between the signals on said dipole and loop means.

8. An antenna system as defined in claim 7 wherein:

said antenna comprises an upper and lower section;

said loop means comprises two elongated conductors extending between said antenna sections; and said dipole means comprises an elongated conductor extending between said antenna sections and located midway between said two elongated conductors of said loop means.

9. An antenna system comprising:

an omnidirectional antenna having a central region;

a ferrite element positioned in said central region;

magnet means for producing a magnetic field in the region occupied by said ferrite element;

a loop means having two arms disposed on either side of said ferrite element for receiving waves generated by said ferrite element as well as receiving waves originally incident on said antenna and propagated to said central region;

network means connected to each of said arms of said loop means for producing a first signal representing the difference between the instantaneous amplitudes of signals on said arms of said loop means, and for producing a second signal representing the sum of the instantaneous amplitude of signals on said arms of said loop means; and phase comparing means connected to said network means for indicating the phase difference between said first and second signals.

10. An antenna system as defined in claim 9 wherein:

said antenna includes upper and lower electrically conductive sections; and each arm of said loop means is a wire having one end connected to said upper section and an opposite end extending through said lower section and insulated therefrom.

References Cited

UNITED STATES PATENTS 3,246,331  4/1966  Royal _____ 343—113
3,246,332  4/1966  Waldman et al. ____ 343—773 X RODNEY D. BENNETT, *Primary Examiner.*

R. E. BERGER, *Assistant Examiner.*